J. J. NOVITSKI.
SPLIT PULLEY.
APPLICATION FILED FEB. 11, 1911.

1,018,263.

Patented Feb. 20, 1912.

Inventor
John J. Novitski.

Witnesses
William Smith
U. B. Hillyard.

By Victor J. Evans
Attorney

UNITED STATES PATENT OFFICE.

JOHN J. NOVITSKI, OF OSHKOSH, WISCONSIN.

SPLIT PULLEY.

1,018,263.   Specification of Letters Patent.   Patented Feb. 20, 1912.

Application filed February 11, 1911. Serial No. 607,965.

*To all whom it may concern:*

Be it known that I, JOHN J. NOVITSKI, a citizen of the United States, residing at Oshkosh, in the county of Winnebago and State of Wisconsin, have invented new and useful Improvements in Split Pulleys, of which the following is a specification.

The present invention relates to band pulleys and particularly to such as are designed to be applied to countershafting, the purpose being to guard against slipping of the pulley upon the shaft in each direction, that is longitudinally or circumferentially.

The invention contemplates the provision of gripping members which are interposed between the pulley and shaft, said gripping members constituting a lining to the hub of the pulley, thereby strengthening the same, resisting wear and at the same time obtaining a firm and positive grip of the shaft to prevent any looseness or slipping of the pulley when the shaft is in operation.

The invention consists of the novel features, details of construction and combination of parts, which hereinafter will be more particularly set forth, illustrated in the accompanying drawing, and pointed out in the appended claims.

Figure 1:
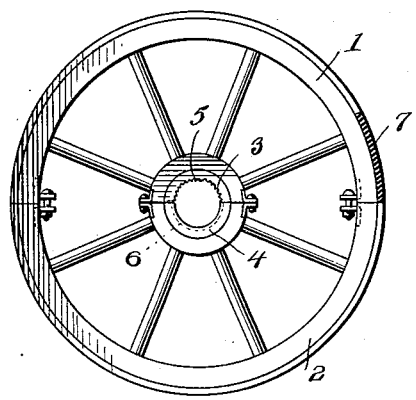
Figure 2:
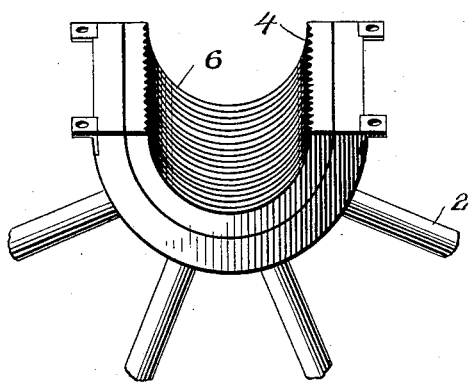
Figure 3:
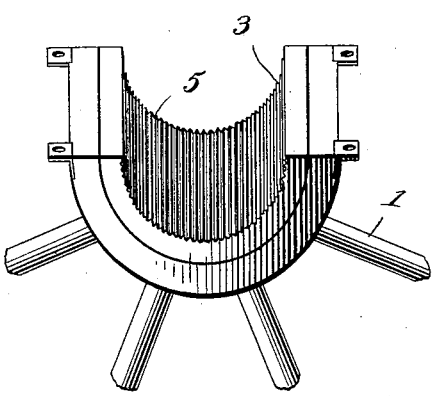

Referring to the drawing, forming a part of the specification, Figure 1 is a side view of a band pulley embodying the invention. Fig. 2 is perspective view of one-half or section of the pulley. Fig. 3 is perspective view of the other half or section of the pulley.

Corresponding and like parts are referred to in the following description, and indicated in all the views of the drawing, by the same reference characters.

The pulley illustrated is of the variety comprising wooden members or sections 1 and 2 each comprising a rim portion, a hub element and spokes, the two sections being adapted to be secured in any convenient and substantial way. Clamp members 3 and 4 are fitted to the hub sections of the parts 1 and 2 and may be retained in place by any means, preferably by some cementitious substance. The clamp members 3 and 4 are preferably of steel and constitute a lining to the hub of the pulley, each being of like formation with the exception of the gripping surface which comes in direct contact with the countershaft. The gripping surfaces of the clamp members 3 and 4 are provided with ribs or corrugations which have their opposite sides sloping to form biting edges. The gripping surface of the clamp member 3 has longitudinal ribs 5, which bite into the shaft and serve to prevent circumferential slipping of the pulley, whereas the clamp member 4 has its gripping surface formed with circumferential ribs 6, which bite into the shaft and prevent longitudinal movement of the pulley. It is to be understood that the clamp members may be provided in any manner and be constructed of suitable material so long as the one has its gripping surface formed with longitudinal ribs and the other with circumferential ribs. The periphery of the pulley has a covering of rubber 7 applied thereto, the purpose being to prevent slipping of the drive belt and while rubber is preferred it is to be understood that any yieldable material may be advantageously employed as a covering to the rim of the pulley.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A band pulley having a portion of the hub opening formed with longitudinal ribs and another portion with circumferential ribs, said ribs having biting edges to engage the pulley shaft and prevent circumferential and longitudinal slipping of the pulley on its shaft.

2. A band pulley having one-half of its hub opening formed with longitudinal ribs and having the other half provided with circumferential ribs, said ribs terminating in edges to bite into the pulley shaft and prevent both longitudinal and circumferential slipping of the pulley.

3. A band pulley formed of sections, clamp members applied to the hub elements of each of the sections, one of the clamp members having its shaft gripping surface formed with longitudinal ribs and the other clamp member having its shaft gripping surface formed with circumferential ribs, said ribs terminating in edges which bite into the pulley shaft and prevent longitudinal and circumferential slipping of the pulley thereon.

In testimony whereof I affix my signature in presence of two witnesses.

JOHN J. NOVITSKI.

Witnesses:
 LOUISE RICHTER,
 ISADOR NOVITSKI.